United States Patent [19]
Hayward

[11] Patent Number: 5,882,570
[45] Date of Patent: Mar. 16, 1999

[54] INJECTION MOLDING GRAPHITE MATERIAL AND THERMOPLASTIC MATERIAL

[75] Inventor: Tommie Hayward, Saugus, Calif.

[73] Assignee: SGL Technic, Inc., Valencia, Calif.

[21] Appl. No.: 724,177

[22] Filed: Sep. 30, 1996

Related U.S. Application Data

[63] Continuation-in-part of Ser. No. 591,363, Jan. 25, 1996, Pat. No. 5,582,781, which is a continuation of Ser. No. 262,743, Jun. 20, 1994, abandoned.

[51] Int. Cl.$^6$ .................................................... B29C 45/00
[52] U.S. Cl. ........................... 264/328.18; 264/29.1; 264/328.14; 264/328.15; 264/328.16
[58] Field of Search ................. 264/29.1, 328.14, 264/328.15, 328.18, 326.16

[56] References Cited

U.S. PATENT DOCUMENTS

| | | | |
|---|---|---|---|
| 4,908,169 | 3/1990 | Galic | 264/328.14 |
| 5,382,384 | 1/1995 | Baigrie | 264/105 |
| 5,500,471 | 3/1996 | Uota | 524/262 |

*Primary Examiner*—James Derrington
*Attorney, Agent, or Firm*—Blakely, Sokoloff, Taylor & Zafman LLP

[57] ABSTRACT

The present invention relates to an inexpensive material and method of making the material having superior heat insulation capacity for use in furnaces and other apparatus. The method comprises grinding flexible graphite foil, preferably recycled material, to a small particle size, thermally shocking the particles to expand them, mixing the expanded graphite with a thermoset phenolic resin, heating the mixture under pressure to form a solid sheet and then heat treating the solid sheet. The present invention also includes a method for making a plastic material by using a thermoplastic material mixed with re-expanded graphite. The compound of thermo plastic material and re-expanded graphite is fed into an injection molding system at a relatively high temperature and injected into a mold where a plastic material is formed. The plastic material is then removed from the mold when the material is still very hot but hard set.

13 Claims, 4 Drawing Sheets

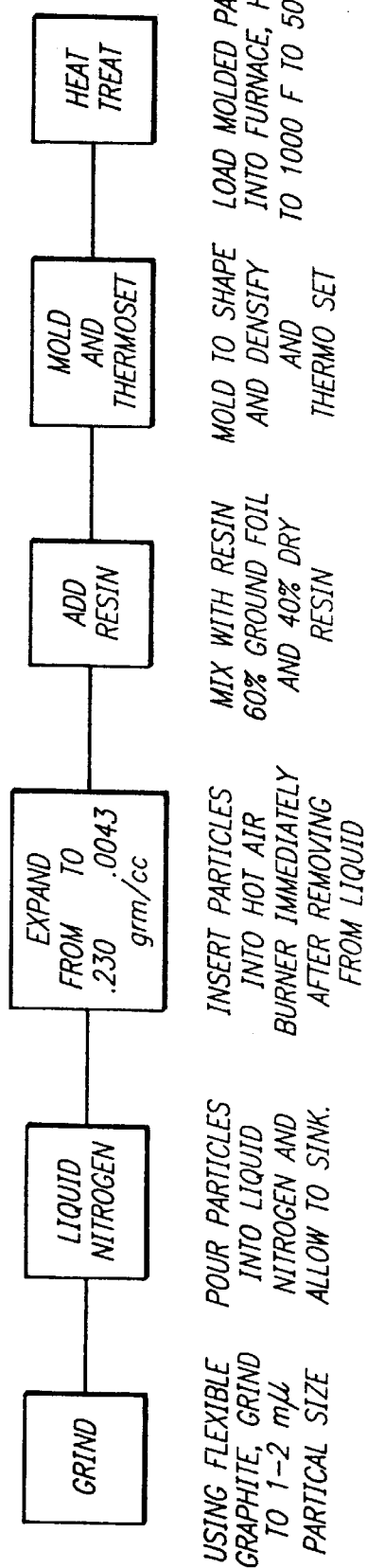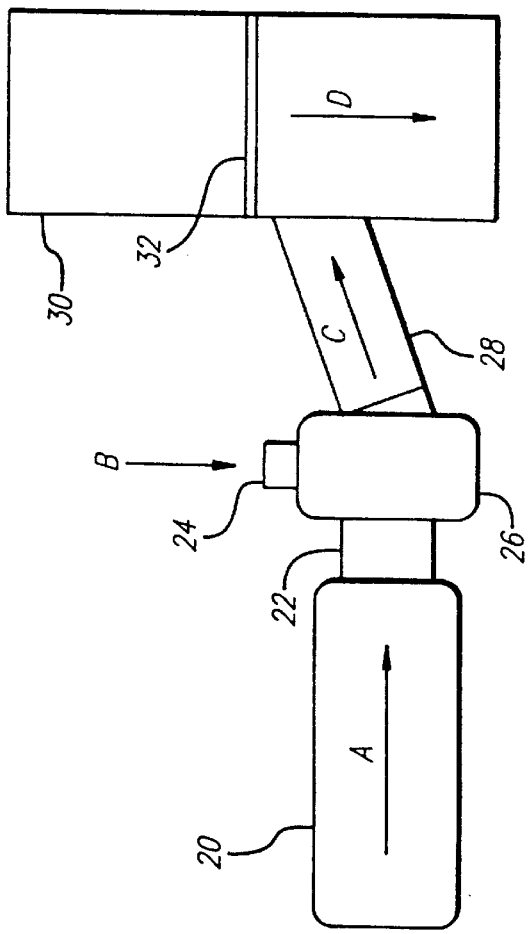

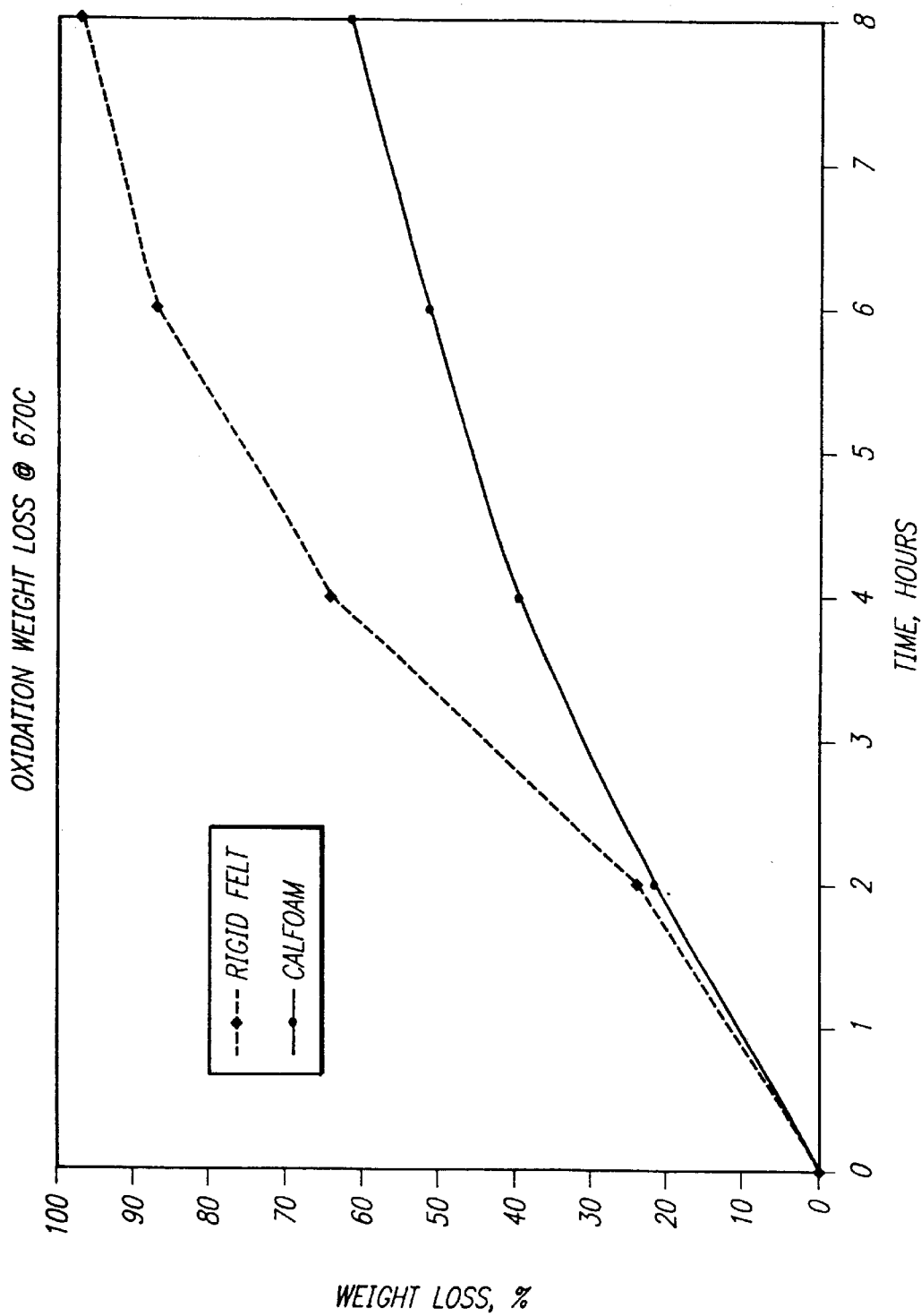

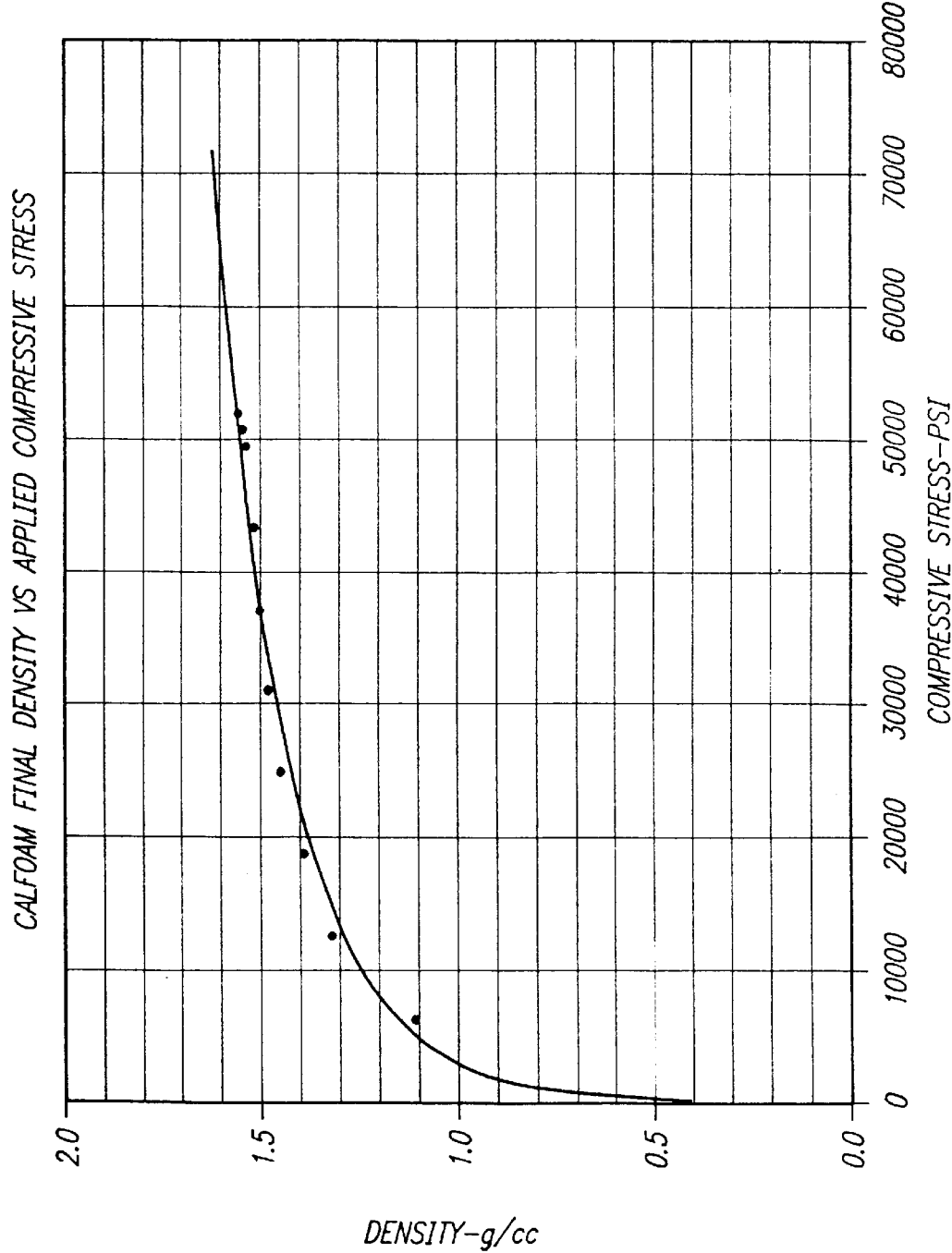

– 5,882,570 –

INJECTION MOLDING GRAPHITE MATERIAL AND THERMOPLASTIC MATERIAL

This is a continuation-in-part of U.S. patent application Ser. No. 08/591,363 filed Jan. 25, 1996, now U.S. Pat. No. 5,582,781, which is a continuation of U.S. patent application Ser. No. 08/262,743 filed Jun. 20, 1994, now abandoned.

BACKGROUND OF THE INVENTION

1. Field of the Invention

The invention relates to graphite foam material, of the type used for high temperature insulation and the like, and to a method of making the same.

2. Art Background

In the prior art, various forms of graphite material have been used as insulating materials in high temperature applications including industrial ovens and furnaces, vacuum furnaces and controlled atmosphere heating apparatus and the like.

One of the first such graphite insulating materials was powdered carbon black which had an appropriate amount of insulating capacity, but was very difficult to handle, relatively heavy, and extremely time consuming to replace. As a result with the advent of foam and resin chemistry, a number of newer materials were developed which were lighter and easier to handle, but which had the requisite insulating capacity. One such material is a carbon fiber insulating material made of a carbon fiber held in a matrix by a phenolic resin material, and formed into a board or block.

Another advantage is the reduced weight loss due to oxidation, resulting in longer furnace life between successive rebuilding of the furnace.

According to the present invention, one may use finished low density blocks, boards, billets, etc. to make higher density parts by cutting (i.e., using, for example, a cork bore or saw) to shape or mold the material into a desired shape and pressing using different pressures to the obtain desired density. For example, die formed rings can be made using the present invention. The compressive strength of the die formed rings was greater than or equal to the strength of some monolithic graphites of the prior art.

The present invention also includes a graphite material and a method for making the graphite material by using a thermoplastic material mixed with re-expanded graphite. The compound of thermo plastic material and re-expanded graphite is fed into an injection molding system at a relatively high temperature and injected into a mold where a plastic material is formed. The plastic material is then removed from the mold when the material is still very hot but hard set.

SUMMARY OF THE INVENTION

The present invention is a composition of matter, and specifically, a material comprising cryogenically treated graphite or carbon particles which are then expanded by thermal shock/gas expansion. The expanded particles are then combined with a phenolic resin, or the like, and then thermoset under pressure at an elevated temperature to form a hardened sheet or plate. The carbon or graphite particles can be obtained from previously expanded graphite which has been made into flexible graphite foil, and therefore, the present invention permits the recycling of graphite foil which is not otherwise commercially distributed. The method of making said material is also described and claimed.

The material has generally the same insulating and other physical characteristic as the prior art carbon fiber insulation materials, and it is less expensive than prior art materials.

Another advantage of the present invention is that it can utilize, without any drawbacks, recycled flexible graphite material, as a starting material. Such recycled flexible graphite material is currently typically being landfilled. Thus, the present invention is particularly advantageous as a benefit to the environment. Additionally, the advantageous method of making the material and the quality of the material made in accordance with the present invention provide additional benefits.

BRIEF DESCRIPTION OF THE DRAWINGS

The objects, features and advantages of the present invention will become apparent to one skilled in the art from reading the following detailed description in which:

FIG. 1 is a flow chart showing on embodiment of process of the present invention.

FIG. 2 is a schematic drawing of the heat shock apparatus used in one method of the present invention.

FIG. 3 is a graph showing the oxidation weight loss of prior art rigid felt as compared with the material of the present invention, which is the invented material at 670° C. over time.

FIG. 4 is a graph showing the final density of the invented material as a result of the compressive force applied to it.

DETAILED DESCRIPTION OF THE INVENTION

Figure 5:
FIG. 5 is a graph showing steps of a second embodiment of a method according to the present invention.

The present invention relates to a material and methods of making materials, with different densities, the materials having superior heat insulation capacity for use in furnaces and other apparatus. The method of making the present invention is shown in the flow chart in FIG. 1.

The starting material is preferably recycled flexible graphite, such as the type which may be obtained as a byproduct from the manufacture of flexible graphite rolls.

The flexible graphite material is sometimes referred to as vermiculated graphite. It is a graphite material which has already been subjected to an expansion process, typically an acid treatment of graphite followed by a heat shock treatment. The starting material can be in the form of chunks, bricks, strips, or any other form which may be obtained.

The flexible graphite is first ground to a very fine powder having a particle size in the range of 35 to 80 mesh and a tap density of approximately 0.177–0.230 g/cc. Somewhat smaller or larger mesh can be used as well, but the particle size is preferably within the range of 35 to 80 mesh as specified. The flexible graphite can be ground in a cone mill grinder or hammer mill grinder or other grinder known in the art.

In the next step, the powdered carbon particles are poured into a container of liquid nitrogen, and permitted to absorb sufficient liquid nitrogen so that they sink in the container below the surface of the liquid nitrogen. It is believed that other cryogenic liquids may also work, and are deemed to be within the scope of the present invention. The sinking of the particles, while not deemed critical to the subject process, appears to be an adequate indicator of sufficient absorption of the liquid nitrogen into the particles, which is important in the following expansion step.

Alternatively, one may treat ground flexible graphite with acid such as fuming nitric acid, sulfuric acid, etc., and then heat the compound, of the respective acid and ground flexible graphite, thereby causing graphite to expand. For example, an experiment was conducted using 4 grams of ground flexible graphite and 6 centimeters cube (cc) of fuming nitric acid. The compound was then heated to 1100 degrees C. The expansion ratio obtained was 8 to 10 times.

The liquid nitrogen soaked carbon particles or the ground flexible graphite particles treated with one of the above-mentioned acids are next injected into a hot air burner in an oven with an air stream flowing therethrough, the oven temperature being approximately 650° F. One such acceptable hot air burner is a propane burner such as a Universal® 40,000 BTU per hour propane heater. One possible arrangement is shown in FIG. 2. As shown the heat shock/gas expansion apparatus comprises a propane heater 20, with the heated air flow direction shown by arrow A, coupled through a conduit 22 to a receiving means 24 which receives the liquid nitrogen soaked particles through the top inlet 26 (which are added in the direction shown by arrow B. The receiving means 24 is coupled through conduit 26 to heat treated particles receiving means 28, which has a screen 30 to prevent the particles, which are now very light, from becoming excessively airborne.

If the recycled graphite particles are used, this heat treatment or thermal shock/gas expansion expands the particles to about 4 to 8 times their original size, and the density of the particles is in the range of 0.080 to 0.030 grams per cubic centimeter. The expanded particles may be compressed and molded to the desired size, shape and density without using the next steps.

The expanded, thermally-shocked, carbon material is then mixed with a resin, and preferably a phenolic resin, and most preferably a phenolic resin such as Borden Durite RD-2414 in a preferred ratio of about 60% carbon to 40% resin by weight. Other ratios may be used, and the selection of a ratio is within the skill of persons of ordinary skill in the art.

Expanded graphite powder can be mixed in an amount ranging between approximately 45%–60% graphite powder by weight with a thermoplastic material in amount ranging between approximately 40–55% by weight.

The mixture is then thermoset at a temperature of 350° F. and a pressure dependent upon the density required for about 1 hour. The shape of the product can be any shape and size as required for the intended purpose.

The thermoset product is then heat treated in a furnace. The temperature of the heat treatment is preferably about 2000° F., but may vary from 1000°–5000° F. depending upon final usage.

The density may be in the range from less than 0.1 g/cc to approximately theoretical density.

FIG. 3 shows a comparison of prior art material to the material of the present invention, and particularly shows that there is substantially more weight loss from the prior art material being exposed to elevated temperature over time which is considered disadvantageous to those skilled in the art.

FIG. 4 illustrates the density of the material as a result of the pressure applied to it during its manufacture.

In another embodiment of the present invention, a method for making a substantially high density graphite material with plastic characteristics (graphite-plastic) is provided. The main steps of this method are shown in FIG. 5. According to this method, a thermoplastic material, such Polyphelene Sulfide (PPS) may be mixed with re-expanded graphite thereby producing graphite pellets. The pellets may then be expanded by using the expansion process described in the foregoing. In this respect, the description of the expansion process presented in the foregoing is herein incorporated by reference. Note that while the expansion process is not necessary to the method described herein, this process is, however, preferable.

In the embodiment, of the method according to the present invention, described herein, the compound material, i.e., pellets, include a thermoplastic material mixed with 45–60% re-expanded graphite, but the present invention is not limited in scope in this respect. The compound material is then injected into a mold at a temperature of approximately 650° F. The mold may have an approximate dimension of 6"×9"× 0.125", but the present invention is not limited ink scope in this respect. The injection of the compound may be performed for approximately 1 minute. Graphite material with plastic characteristics is then formed into plates, or other type of shapes in the mold at a temperature of 250° Fahrenheit and removed therefrom when the material is still hot, but hard set.

The resulting graphite material with plastic characteristics produced may be formed into different geometries due to its high density of the produced which allows the graphite-plastic materials produced to be shaped better. The graphite-plastic plates obtained have a density of approximately 1.5 grams per cc. It is believed that any thermoplastic material may be used in this process instead of the PPS.

A graphite-plastic material according to the present invention may also be obtained by using a thermosetting plastic such as phenolic resin, epoxy resin, and mixing it with graphite powder. The compound of thermoset material and the graphite powder may then be heated to a temperature that is below the thermosetting temperature (350° F.) for approximately an hour and then introduced in a mold by using a process of hot pressing which is well-known by one skilled in the art. It will be noted that instead of graphite powder, re-expanded graphite may be used in this process.

The present invention also provides a method for making an electrically conductive plastic that has a relatively low resistivity. According to this process, a PPS material or a liquid crystal polymer (LCP) resin is mixed with re-expanded graphite to make pellets as explained above. The pellets are then mixed in a tumbler with 20% by weight nickel coated carbon fibers. The nickel coated carbon fibers may be a mixture of 50% carbon particles and 50% nickel in various concentrations. The addition of nickel coated carbon fibers to the pellets causes a decrease the bulk resistance of the pellets from approximately 0.100 ohm inches to 0.00085 ohm inches. Then this compound is subject to an injection molding process as explained in the foregoing. The material produced has both a low electrical resistivity and a high corrosion resistance. Moreover, the material produced may be used for bipolar plates in photon exchange membrane (PEM) type fuel cells, gaskets such as intake manifold, flange gaskets, etc. for automotive devices.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of making a graphite material, the method comprising the steps of:
   a) grinding flexible graphite into a powder having a particle size in the range of 25 to 80 mesh;
   b) expanding said graphite powder 8–10 times;
   c) mixing the expanded graphite powder, in an amount ranging between approximately 45%–60% graphite powder by weight, with a thermoplastic material in an amount ranging between approximately 40%–55% by weight; and
   d) injecting into a mold the graphite powder mixed with the thermoplastic material.

2. The of claim 1 further including the step of removing said graphite material from said mold when said plastic material is at a temperature of approximately 250° F.

3. The method of claim 1 wherein said plastic material formed has a density of approximately 1.7 grams/centimeter cube.

4. The method of claim 1 wherein said thermoplastic material includes polyphenylene sulfide.

5. The method of claim 1 wherein said graphite of step a is recycled graphite foil.

6. The method of claim 1 wherein the injection step is performed for approximately 1 minute.

7. A method of making a graphite material, the method comprising the steps of:
   a) grinding flexible graphite into a powder having a particle size in the range of 25 to 80 mesh;
   b) expanding said graphite powder 8–10 times;
   c) mixing the expanded graphite powder, in an amount ranging between approximately 45%–60% graphite powder by weight, with a thermoplastic material in an amount ranging between approximately 40%–55% by weight;
   d) providing a compound by mixing the expanded graphite powder and the thermoplastic material with 20% by weight nickel coated carbon fibers; and
   e) injecting into a mold the compound.

8. The method of claim 7 wherein an electrical resistance of said graphite material is in range of 0.01 to 0.0008 ohm inches.

9. The method of claim 7 further including the step of removing said plastic material from said mold when said plastic material is at a temperature of approximately 250° F.

10. The method of claim 7 wherein said plastic material formed has a density of approximately 1.7 grams/centimeter cube.

11. The method of claim 7 wherein said thermoplastic material includes polyphenylene sulfide.

12. The method of claim 7 wherein said graphite of step a is recycled graphite foil.

13. The method of claim 7 wherein the injection step is performed for approximately 1 minute.

* * * * *